(12) United States Patent
Bevilacqua et al.

(10) Patent No.: US 7,712,300 B2
(45) Date of Patent: May 11, 2010

(54) WATER TREATMENT AND PRESSURIZATION SYSTEM FOR THE ADIABATIC COOLING OF COMBURENT AIR

(75) Inventors: Leopoldo Bevilacqua, Zurich (CH); Roberto Gasparetto, Milan (IT); Aldo Di Rienzo, Assago-Milano (IT)

(73) Assignee: Edoardo Lossa S.p.A., Milan (IT)

( * ) Notice: Subject to any disclaimer, the term of this patent is extended or adjusted under 35 U.S.C. 154(b) by 971 days.

(21) Appl. No.: 10/560,913

(22) PCT Filed: Jun. 16, 2004

(86) PCT No.: PCT/IB2004/002047

§ 371 (c)(1),
(2), (4) Date: Jun. 13, 2006

(87) PCT Pub. No.: WO2004/111413

PCT Pub. Date: Dec. 23, 2004

(65) Prior Publication Data

US 2007/0000229 A1    Jan. 4, 2007

(51) Int. Cl.
*F02C 3/30* (2006.01)

(52) U.S. Cl. .................................... 60/39.53; 60/728
(58) Field of Classification Search ............... 60/39.53, 60/39.58, 39.59, 728, 775
See application file for complete search history.

(56) References Cited

U.S. PATENT DOCUMENTS

| | | | |
|---|---|---|---|
| 5,867,977 A * | 2/1999 | Zachary et al. | 60/39.53 |
| 6,581,368 B2 * | 6/2003 | Utamura | 60/39.3 |
| 2001/0022078 A1 * | 9/2001 | Horii et al. | 60/39.182 |
| 2002/0083712 A1 * | 7/2002 | Tomlinson et al. | 60/775 |

* cited by examiner

*Primary Examiner*—Louis J Casaregola
(74) *Attorney, Agent, or Firm*—Hedman & Costigan, P.C.; James V. Costigan (57) ABSTRACT

A water treatment and pressurization system for the adiabatic cooling of comburent air destined for plants using gas turbines (15), run by measuring, control and regulation units, comprising a lifting and pressurizing station (16) of vaporization water at a varying flow-rate for a maximum operating pressure, preferably up to 120 bar, associated with a series of nozzles (20) situated on nozzle-holder ramps (12) downstream of which there is at least one housing unit (44) for humidity and temperature probes (52-55). The lifting station (16) comprises at least two pumps (22) with relative auxiliaries devices connected to nozzle-holder collectors (39).

10 Claims, 6 Drawing Sheets

WATER TREATMENT AND PRESSURIZATION SYSTEM FOR THE ADIABATIC COOLING OF COMBURENT AIR

The present invention relates to a water treatment and pressurization system for the adiabatic cooling of comburent air. In particular, said air is used by machines and plants for the feeding of gas turbines in motility configurations, designed by constructors and users thereof.

In particular, an object of the invention relates to a system whose components consist of a treatment and pressurizing unit for feeding, under specific and controlled conditions, one or more humidification plants operating in saturated and over-saturated psychrometric fields, capable of treating said comburent air, for an optimal density, in order to satisfy constructors' and users' demands for the gas turbines themselves. The ideal density conditions of said comburent air are established, according to ISO regulations, at a temperature of 15° C., a relative humidity of, 60% and a barometric pressure of 1013 hPa. The system was conceived for integration in treatment sections of comburent air for both new and existing plants. The components of the system object of the present invention were conceived, selected and dimensioned in relation to the specific use.

Experiences so far acquired in the field of the adiabatic cooling of comburent air for gas turbines have shown, in the widest range of enforcements, the importance and contribution given by this process to functional and energy-relating improvements provided in installations of said gas turbines. The type of installation which offers an excellent relationship between investment, capital return and technical performances is the so-called "fogging" installation. There are various versions of this system, which has been adopted in many industrial areas, has undergone gradual evolution and still represents a good basis for further development.

Within this technology, the best solution from an energy point of view, is represented by the omission of drop separators. This allows the pressure drops of the aeri-form flow passing through the treatment unit, to be limited. The elimination of drop separators, however, requires the use of nozzles having such characteristics as to allow a dimensional spectrum of the single drops, coming from the vaporization process, which satisfy the parameters requested by the constructors and users of plants which adopt said turbines. Experiences so far acquired in comburent air cooling installations have revealed various problems which the present invention is proposing to help solve. The following problems can be mentioned:

- a pressure level higher than 100-120 bar of the water used implies the use of materials, adopted for the construction of the nozzles and pumps, with high mechanical characteristics. The duration of these components, in spite of adequate technical selections, can undergo a strong reduction, whereas the operating costs can be increased;
- the operating conditions so far observed have revealed the importance of flow uniformity and constancy of the water feeding pressure to the nozzles. In order to maintain as narrow a feeding pressure range as possible, the running of the pumps requires a special regulation system. A high fractionation degree of the pumping system, adopted by some constructors, is not sufficient on its own to guarantee operating conditions which allow optimum ejection conditions of the vaporized water. The insertion and disconnection of the single pump engines must consequently be programmed to allow the optimal use of the type of nozzles installed. Emphasis must therefore be laid on a new partializing system of the water flow to the single nozzle ramps;
- the air humidification and saturation and/or over-saturation control and regulation systems are not always capable of accurately controlling the real psychrometric conditions of comburent air, in the absence of regulation and control units with the relative feed-back interaction (for example, downstream of the vaporization process). This can cause inappropriate feeding conditions for the gas turbine (for example uncontrolled over-fogging), with possible variations in energy yield and damage due to erosion to the turbine components themselves;
- experience has demonstrated that the positioning of the measuring and control units must not give access to their possible subsiding with the consequent entrainment of components towards the turbine downstream of the treatment. In the case of the insertion of adiabatic cooling plants in existing structures, uncontrolled turbulence phenomena can occur, which can create considerable differences in the thermo-hygrometric conditions in various points of the coordinates of a passage section of the aeriform flow. The configuration and positioning of the control and measurement points must therefore overcome this problem with the relative drawbacks so far observed in some installations;
- in most currently installed control and regulation systems, the lacking modulation of the water flowrates on the single pumps, causes a high number of connections and disconnections thereof, with a consequent mechanical deterioration of the pumps and electric components. This problem, sustained by a particular, prolonged and uncontrolled intervention of the pumps, can cause an uncontrolled water flow to the nozzles and a consequent lack of control of the thermo-hygrometric conditions at the inlet of the turbine compressor.

An objective of the present invention is to provide a system capable of overcoming, among other things, the disadvantages listed above.

This and other objectives according to the present invention are achieved by producing a water treatment and pressurizing system for the adiabatic cooling of comburent air as illustrated in claim 1.

Other characteristics of the invention emerge from the subsequent claims.

From what is specified above, the following integrated solution has therefore been elaborated, resulting in a system which can satisfy the demands of plant constructors and users adopting gas turbines.

The approach of the present invention is to select and integrate a series of specific products, designed and inserted within the context of an adiabatic cooling system of comburent air for gas turbines.

Among the most important parameters, not exhaustively listed, the following can be advantageously mentioned:

- the possibility of integrating the water vaporization system in auxiliary plant configurations of both new and existing constructions;
- the possibility of saturating the comburent air, in order to obtain improvements in the energy yields required. If desired, the temporary over-saturation of the air must also be feasible;
- the possibility of maintaining a pressure range, preferably varying from 70 to 120 bar, compatible with the optimum operating conditions of the vaporization nozzles envisaged, which allow vaporized water to be introduced into the comburent air flow in the form of drops with a high degree of dimensional uniformity, within a range of 10-20 microns (D10) and 10-30 microns according to the calculated value of the Average Sauter Diameter (D32);

the possibility of maintaining in modulating phase of the plant running, the water flow-rate and feeding pressure to the nozzles within a pre-selected range, close to the optimal conditions of use of the nozzles.

The characteristics and advantages of a water treatment and pressurizing system for the adiabatic cooling of comburent air according to the invention will appear more evident from the following illustrative and non-limiting description, referring to the enclosed schematic drawings in which.

With reference to the figure, this schematically shows a water treatment and pressurizing system for the adiabatic cooling of comburent air, used by machines and plants envisaged for the feeding of gas turbines. As mentioned above, the system carries out its action specifically under the ideal conditions established.

The system, object of the present invention comprises an air feeding zone, which can be schematized in a chamber 11, which sends the air to nozzle-holder ramps for vaporization water 12 before an inlet 13 into a duct 14 which conveys air to a turbine 15. The vaporization water is conveyed to the nozzle-holder ramps 12 from a vaporization water pressurizing station 16.

In the chamber 11, there are also an atmospheric air temperature probe 17, an atmospheric air humidity probe 18 and optionally a differential pressure probe 19 for the air flow control.

The dimensioning, with respect to the water flowrate, the prevalence, the selection of the construction materials, the fractionation of the total flow-rate and the hydrodynamic characteristics of the single components of the vaporization water pressurizing station 16, are in relation to the gas turbine (s) 15 to which they are subjected. The maximum operating pressure is preferably 120 bar. This value is established by the hydrodynamic characteristics of the nozzles 20 envisaged. On the basis of the project selections, this choice is aimed at avoiding physico-mechanical stress to the system, observed in other types of plants, having the same operative purposes and running at pressures higher than approximately 120 bar. In particular, in the case of a group of multiple pumps, aggregated to a single control system, one or more pumps with different flow-rate and prevalence conditions, can be selected. This allows a regulation function, controlled by the plant described hereafter, capable of satisfying flow-rate and prevalence magnitudes, specific for the nozzles, particularly under partialization conditions thereof. The operating valve unit is selected and inserted into the station in question with protection functions of the single components, intervention selection of the pump(s), opening/closing of the interception and/or regulation and partialization valves. The operations linked to these functions can be effected manually and/or automatically. The pumps can be totally or partially equipped with a continuous electric-electronic inverter of the rotation rate. This allows a specific intervention for controlling the thermohygrometric conditions of the comburent air flow, sent to the gas turbine(s) 15.

Figure 1:
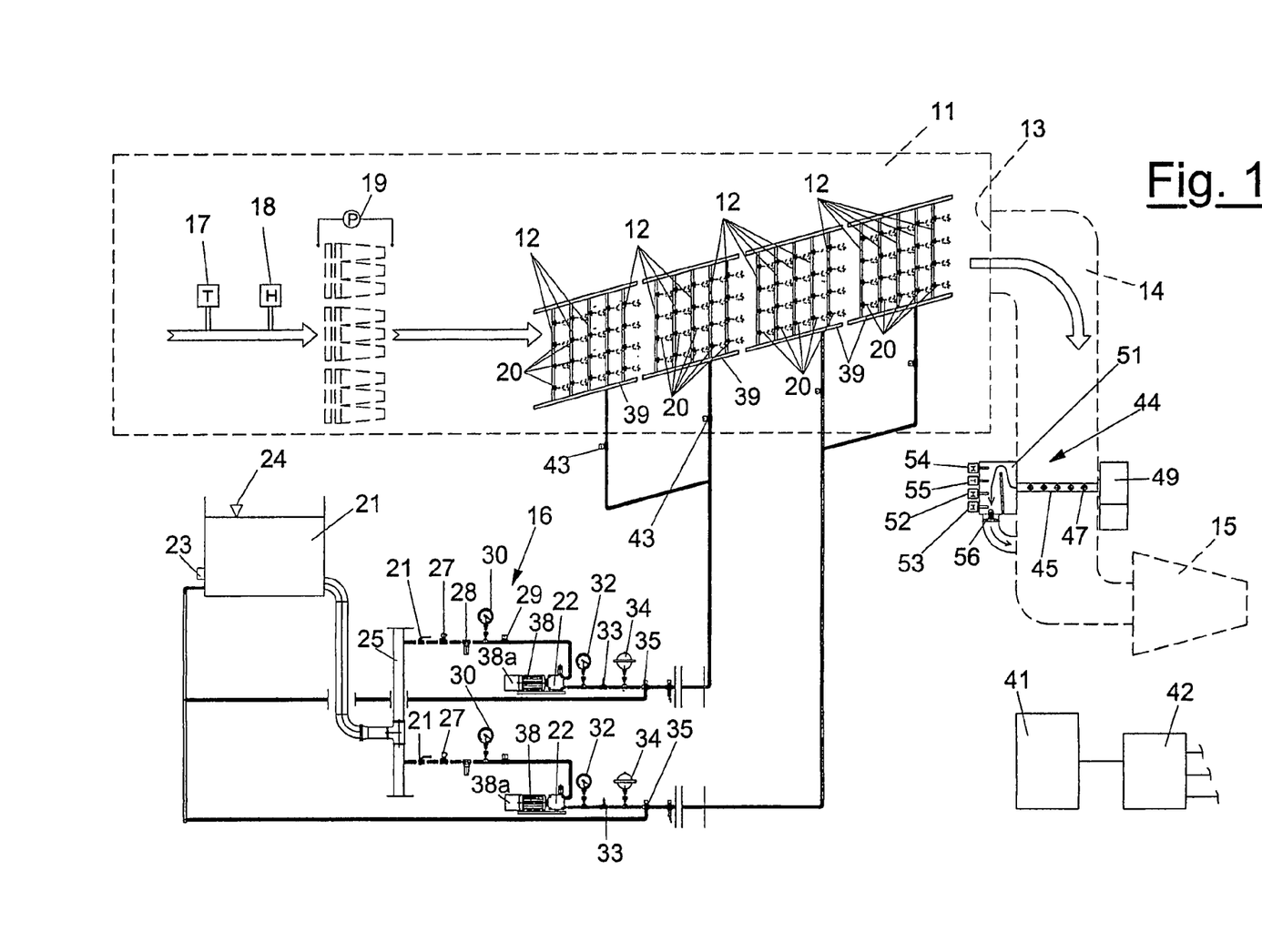
FIG. 1 is a schematic view of an embodiment of a water treatment system for the adiabatic cooling of comburent air according to the invention.
Figure 2:
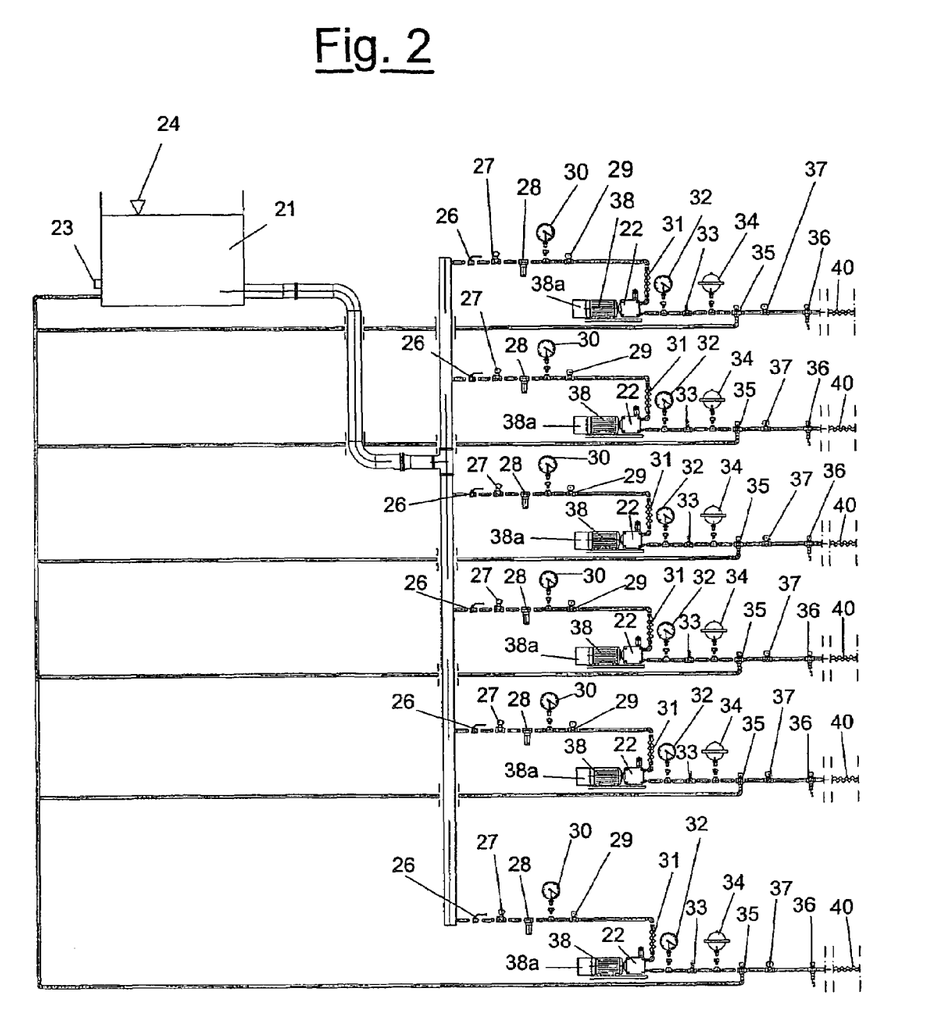
FIG. 2 is a partial view of FIG. 1.

The main components can consist of a collection tank 21 of the plant feeding water, envisaged with the aim of obtaining a constant feeding pressure to single pumps 22 and equipped with a control system of the minimum 23 and maximum 24 levels, as well as feeding connections to the pumps 22 and connection to the by-pass and discharge valve(s) of the collector(s) 25 (FIG. 1 and FIG. 2). There are one or more pumps 22 for the pressurization of said water, selected for a water flow-rate in relation to the gas turbine(s) 15 subjected thereto, and a maximum operating pressure preferably of 120 bar. The pump or pumps 22 are each equipped with a series of components (FIG. 3) which, on the suction side are a manual interception valve 26 for excluding the water feeding, an electromagnetic valve 27 of the on/off type upstream of a filter 28 and a minimum pressure manostat 29. The electromagnetic valve 27 is arranged so as to automatically exclude the flow when the functioning of the pump(s) 22 is in stand-by or when the plant is closed. The filter 28, which is mechanical and, for example, of the cartridge type, has a filtering capacity of 10/20 microns. There is also a glycerin bath manometer 30, with a mechanical action for the analogical reading of the feeding pressure in loco, the minimum pressure safety manostat 29, interfaced with the regulation system, to protect the pump(s) 22 in the case of lack of water flow, with connection to the control and regulation system. Finally, there is a flexible connection 31 to the water conveyer duct.

Figure 3:
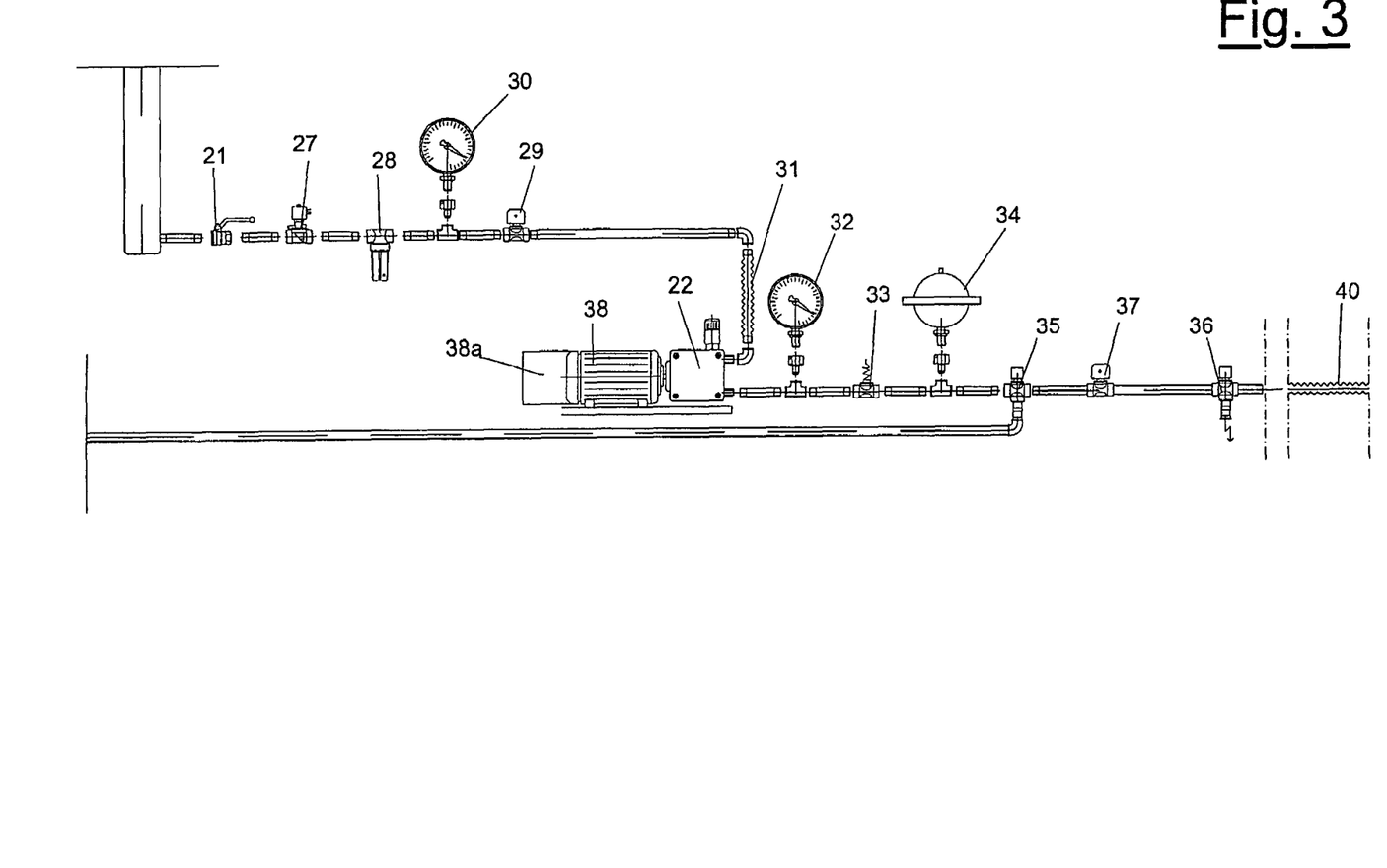
FIG. 3 is an enlarged view of a pumping station.

On the pressing side of the pump 22, there is a manometer 32 for controlling the pressurization state, a safety valve 33 pre-calibrated for the plant protection of the maximum allowable operating pressure. In addition, there is a hydraulic accumulator 34 for the compensation of the pressure differences generated by the operating of the pumps. A three-way by-pass valve 35, calibrated at the maximum operating value, preferably not higher than 120 bar and lower than the calibration value of the safety valve, precedes a three-way valve 36, inserted downstream and in sequence with the previous bypass valve 35. This allows the supply network to be discharged when the pumps 22 are stopped, thus avoiding dispersion in the aeraulic flow of water drops, not suitable for the cooling process. The measuring, regulation and control system provides for the activation of this valve, in relation to the running conditions of the system. It receives the opening consensus for the conveyance of the water to the collector(s) and nozzle-holder ramp(s) when the feeding pressure reaches a minimum value of 70 bar.

Finally, a maximum/minimum pressure manostat 37 is capable of guaranteeing the operating pressure range and optimization of the pressure of the fluid sent to the nozzles, and also verifies any possible operating anomalies in the water conveyance components to the nozzles. The signals generated therefrom are identified and transmitted to the positions envisaged in the regulation system.

When there is a series of pumps, these can be totally or partially equipped with a motor-inverter 38 associated with a continuous electric-electronic control 38a of their rotation regime. The pumps with the inverter control the minimum intermediate regulations and there is a flexible duct 40 for the connection of each pump to ramp-holder collectors 39.

The automatic operating of the station is run by the measuring, regulation and control system described hereafter.

The configuration of the following cooling system, which has the characteristic of vaporizing water in an open cycle requires, in addition to the upstream treatment of the lifting and pressurizing station, a treatment plant of the vaporization water. This is designed and constructed in relation to the physico-chemical characteristics of the water supplied to the nozzles. In particular, one or more filtration/mechanical separation steps of the slurries are inserted, using components with a mechanical and/or electromagnetic action. The running can be manual and/or automatic, in relation to the inflow conditions of the feeding water and desired water volumes.

A measuring, control and regulation plant is also envisaged, with the purpose of controlling the process development, suitable for fulfilling the psychrometric state conditions, envisaged for the preselected running of the system. This contemplates the humidification and adiabatic cooling of the comburent air to values close to saturation. There is also the possibility of reaching a controlled over-saturation. The differences in temperature, relative and absolute humidity values, as also the enthalpy values obtained from the adiabatic cooling process between the inlet and outlet points of the system, are in relation to the psychrometric conditions of the external air sucked in. Compatibly with the psychrometric conditions of the latter, the plant in question is automatically run in order to obtain, within the air saturation range, temperature values of comburent air at the outlet as close as possible to 15° C.

It comprises specific components for the single functions and for coordinating these both inside and outside the system.

The following objectives have been established on the basis of the project and operating selections:
  measurement of the magnitudes implied in the process, such as temperature, relative humidity of the air treated, and by deduction other variables, such as absolute humidity and enthalpy;
  control/command of the plant components on the basis of the magnitudes mentioned in the previous point and values complying with the operating conditions of the gas turbine(s), such as start/stop of the pump(s), opening/closing of the automatic sectioning valves and manostats;
  regulation of the components installed;
  automation of all the processes implied in the system on an interaction basis of the functions envisaged;
  calculation and registration of the operating conditions, insertion, collection, filing and transmission of the data collected;
  transmission of the data according to the previous points outside the system in question for its specific running, for example in coordination with the wet compression, according to the demands required by the constructor(s) and user(s) of the turbines;
  data reception and processing and order/command functions outside the system and integration/implementation of these in the plant.

This plant envisages, as components, a regulation station of the PLC 41 type which has the functions described above and an electric power panel 42 which provides for the feeding of the points of use and exerts safety functions of the electric section.

The supply pumps 22 to the nozzles 20 can be equipped with electric-electronic regulator(s) 38a of the rotation regime (inverter) and connected to the abovementioned panel 41.

The nozzle-holder ramps 12 are equipped with valves of the on-off type 43, which allow the inflow/closure of water to the same (FIG. 1).

The humidity and temperature probes 18, 17, as installed in FIG. 1, measure the values upstream of the water vaporization plant. Downstream, the humidity and temperature probes 52, 53, 54 and 55 are housed in a complex of special containers.

The pressure probes, flow-meters and manostats installed, monitor the operating conditions of the water feeding circuit and/or circuits to the nozzles, providing the necessary consensus to the pumps.

A description follows of the control process of the psychrometric state conditions of the comburent air treated by the system, object of the present invention.

The main parameter constantly controlled is the relative humidity. This allows the saturation degree of the comburent air to be controlled, creating the conditions for the optimization of the air conditions close to the saturation line. This state condition allows an improvement, amply demonstrated both by the technical physics and also by previous engineering experiences in this field of application, of the energy yield of the gas turbine. The temperature is controlled in relation to a limit, for example 15° C., set as a lower limit condition, established by particular operating demands of the turbine(s).

Further parameters, such as the enthalpic air content and absolute humidity, as an extrapolation of the temperature and relative humidity values can be revealed from the plant. Their detection allows the potential and relative exploitation of the external conditions of the comburent air, to be observed and registered.

As described above, particular attention is paid to controlling the functioning of the water vaporization pressurizing station.

A series of research activities carried out on the behaviour of the vaporization nozzles has demonstrated that the optimal magnitude spectrum, according to the Sauter Average Diameter criterion, of the vaporized water drops, is only maintained within the preselected tolerance limits by operating within a certain pumping pressure range. The selection of the vaporization nozzles is effected, as described above, taking this problem into account. As the psychrometric state conditions of the external feeding air are continuously varying, the difference in the water content in the inflowing air and outflowing air of the system, object of the present invention, will also vary. The water flow-rates are consequently subjected to continuous variation, as the maximum saturation set-point of the air is the delivery point of the plant. The water feeding to the collector(s) and the respective nozzle-holder ramp(s) are sectioned with suitable on-off electrovalves, allowing a high partialization degree.

FIG. 1 enclosed shows a basic configuration which is adapted to the various application demands.

This partialization configuration envisages the modulation of the water flow-rate conveyed to the vaporization nozzles. Within the concept of the present invention, a selection was effected which has given positive results in similar applications. This selection comprises, according to the turbine(s) envisaged, the partial or total supply of electric-electronic regulators of the rotation regime (inverter). These construction proposals allowing the modulation of the water flow-rate. The most compatible conditions with the hydrodynamic characteristics of the vaporization nozzles are thus created.

In the case of several pumps, the control of the relative humidity of the air conveyed to the turbine is obtained by inserting, in sequence, pumps which feed the collector(s) and nozzle-holder ramp(s), without exceeding said psychrometric condition in the insertion phase of a vaporization group. The sequence is given by the opening of the motorized valve, assembled on the conveyor duct(s).

When the minimum pressure manostat indicates the presence of water, it activates the pump assigned to the starting phase. The rotation regime of the pumps inserted by the PLC regulation station, is modulated by the inverters installed thereon. The pump(s) previously activated are, on the other hand, directly connected to the electric power line and therefore operate according to the maximum capacity defined in the project.

The signal which regulates the inverter increases or decreases the water flow-rate, in relation to the entity of the shift developed between the humidity of the air conveyed to the turbine and the set-point of the relative humidity value, freely selected (loop master). The pump(s) connected to the inverter operate(s) according to the technical specifications of the constructor in a minimum range, e.g. 40% of the maximum water flow-rate, enforced by the inverter. The regulator has the function of operating in the remaining regulation range, e.g. from 40 to 100%.

Following the effects produced by the minimum functioning regime and consequently partialization, before activating the functioning of a pump, the PLC regulation station verifies, by means of a prediction calculation, inserted in the control software, the greatest adiabatic yield obtainable, avoiding exceeding the set-point of the psychrometric conditions established. The software envisaged for the running of the pump(s) includes the possibility of monitoring, should the limits of the relative humidity, and consequently saturation values, be exceeded. In this case, the pump assigned for the subsequent insertion by the PLC regulation station is not activated.

The software processed for the running of the present plant envisages a prediction calculation which also takes into account the temperature of the water conveyed to the vaporization nozzles.

Said PLC regulation station has the task of establishing and subsequently assigning the insertion of the pump(s) with the relative connection to the inverter.

The various commands are transmitted to the electric panel which provides for the insertion of the pump(s) to the inverter or directly to the power line. This operating sequence of the pumps allows the functioning characteristics to be satisfied, which is suitable for fulfilling, as far as the operating pressure is concerned, the hydrodynamic characteristics of the vaporization nozzles.

Should the temperature of the air conveyed to the turbine be close to or reach the freely selected value, e.g. minimum temperature limit of the comburent air treated of 15° C., the PLC regulation station progressively excludes one or more pumps, in order to prevent said temperature from dropping below the prefixed limit.

By using a certain number of pumps, this technical solution allows a segmentation with a continuity solution, within a pre-established pressure range, in the water flow-rate/absolute humidity difference ratio.

The pressure range is established, as already mentioned, by the hydrodynamic characteristics of the vaporization nozzles, pressure values predicted as ranging from 70 to 120 bar.

The present plant envisages the measurement and regulation of the temperature and relative humidity parameters before and after the comburent air treatment.

The magnitudes thus registered in real time allow the consequent intervention of the regulation units, thus avoiding prediction scenarios and deductions based on measurements effected only upstream and/or downstream of the system.

If, on the other hand, the relative humidity of the air conveyed to the turbine should exceed the delivery value established by a safety humidistat or if in the drawing ducts on which the above-mentioned temperature and humidity probes are positioned, these and the humidistat itself were not to detect an air passage, specified by a manostat or manometer, the water conveyer pumps to the nozzles would all be disconnected. The electric interblocks envisaged would then start functioning.

For operative purposes of the turbine(s), the running of the system, object of the invention, must be monitored in order to guarantee in all operating phases of the system in question, the integrity of the turbine itself. A configuration such as that illustrated in FIG. 3, which is not necessarily exhaustive and which is described above, can therefore be proposed for the running of the safety mechanism and alarms implied.

On the basis of experience so far acquired in the field of use of gas turbines 15, a particular housing unit 44 for the humidity and temperature probes, situated downstream of the vaporization section in the duct 14, has been envisaged.

This has been conceived and developed, as a non-uniformity of the thermo-hygrometric conditions has been observed, in existing plants, in the various sections of the suction duct 14 of the gas turbine 15. As a result of this, a single detection of such thermo-hygrometric conditions can cause distortions and shifts in the values subjected to control. These drawbacks can be avoided by increasing and/or varying the number and position of control points. Said housing unit 44 for the humidity and temperature probes, situated downstream of the vaporization section in the duct 14, consists, as shown in FIG. 4, of one or more derivation and conveyor ducts of the comburent air in transit, applied both at the inlet and outlet of the installation zone of the vaporization nozzles.

The main components of this unit 44 are a flanged tube 45, fixed on its two ends, preferably in a horizontal position, to walls 46 of the section of the suction duct 14 of the gas turbine 15. It is equipped with openings 47 positioned on the same line and arranged at a distance according to operating demands. Coaxially and inside the above tube 45, there is a tubular duct element 48, which is moved in a rotational direction by a motor-reducer 49 which controls and varies the rotation regime. The duct 48 is equipped with a number of holes 50 in relation to the type of gas turbine 15. Said holes 50 are positioned out-of-axis on the surface of the duct 48.

The rotational movement of the duct allows the selection of the sucked air flows in different points of the comburent air transit section in the duct 14. The air sucked by the duct passes through a chamber 51 which houses measurement and control units.

Figure 4:
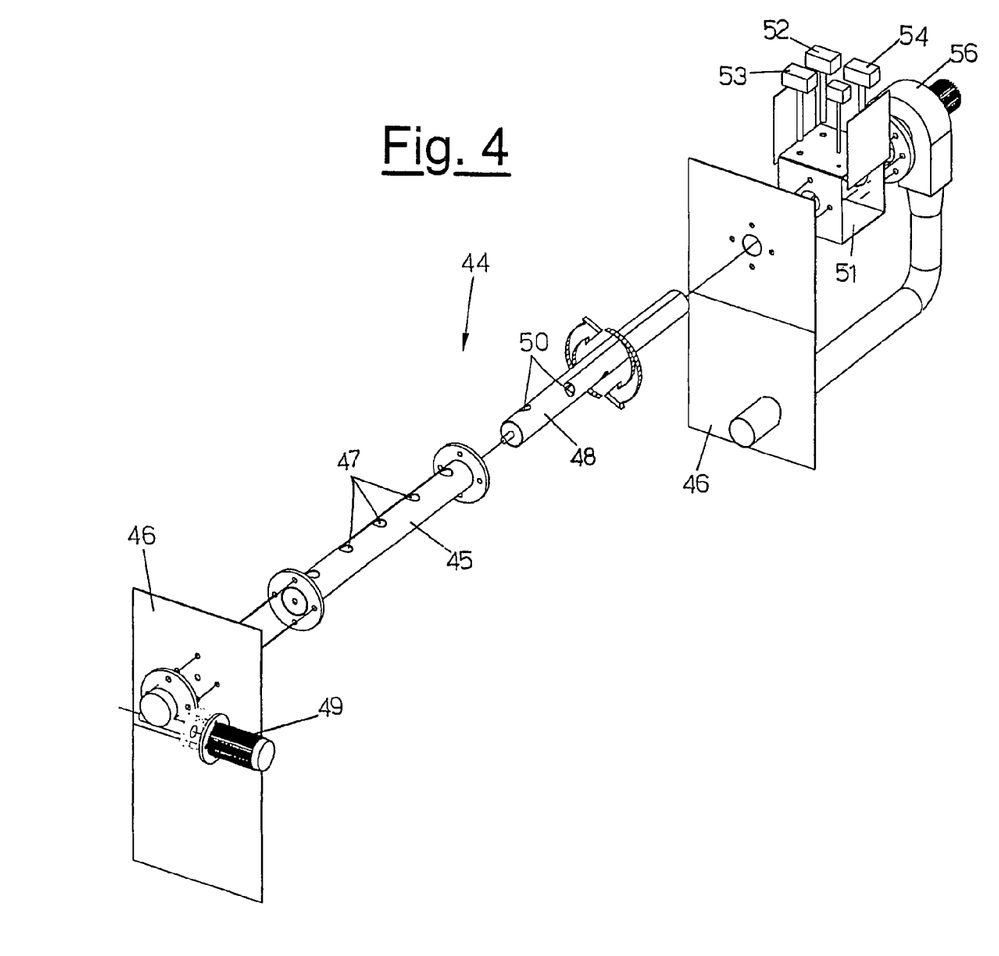
FIG. 4 is a perspective view of a first embodiment example of a probe housing unit forming part of the system represented in FIG. 1.

Said measurement units are, for example, a pair of relative humidity probes 52, 53 of the air treated compared with each other, a humidistat 54 of the air treated and a temperature probe 55 of the air treated (FIGS. 1 and 4).

The suction of the air necessary for the measurements is effected by means of an appropriately selected fan 56, connected on the pressing side to the transit section of the comburent air duct 14. In the case of damage or collapse of the measurement and control devices, this unit prevents them from falling into the suction section of the gas turbine. Their protection is thus ensured.

The running of the measurement, regulation and control parameters is envisaged in relation to an intervention coordinated with the so-called "wet compression" under action in the gas turbine(s). This is obtained by establishing, according to the necessities of the constructor and/or user of the gas turbine(s) at pre-selected humidity and temperature values, the outflow conditions of the system of the invention.

The system is also equipped with an alarm network, integrated in the measurement, control and regulation plant which can have the following non-limited functions:

evaluating the reliability of the measurements produced by the temperature and humidity probes and comparing them with those expressed by the comparison probes. A significant shift and exceeding of the threshold values freely established, generates an alarm. If a threshold value higher than that attributed to the alarm function is exceeded, a stop function is activated, for example of all the pumps;

generating the corresponding alarm if the pressure probes inserted on the suction and supply sides, when any of the pumps has been inserted, indicate that the pressure values do not enter within the freely established minimum or maximum off-set limits of the assigned band;

activating each alarm only if it remains for a certain duration of time, established during the set-up phase. In the case of the pump controlled by the rotation regime regulator (inverter), the alarm, due to the lack of fluid flow, is only generated after the relative control signal is close to the maximum regime condition;

memorizing damage signaling(s). The alarm signaling can, for example, only be reset after removing the cause that produced it;

returning the position of the valve(s) inserted in the vaporization water circuit(s) back onto the controller and allowing the nature of the operative anomaly to be identified, for example, the non-opening of an on/off valve assigned to a pump or an anomalous functioning of the pump itself;

monitoring the rotation regime regulators (inverter) and controlling the insertion of the pumps.

The alarms are connected to the humidity probes, minimum temperature probes, humidistat, minimum and maximum pressure probe (supply side of the pump(s)), minimum pressure probe (suction side of the pump(s)), differential pressure probe for the control of the comburent air flow.

The values read in the various measurement points can be memorized in the regulation station.

They can be remote transmitted for the appropriate signaling, for a possible remote running of the plant.

Figure 5:
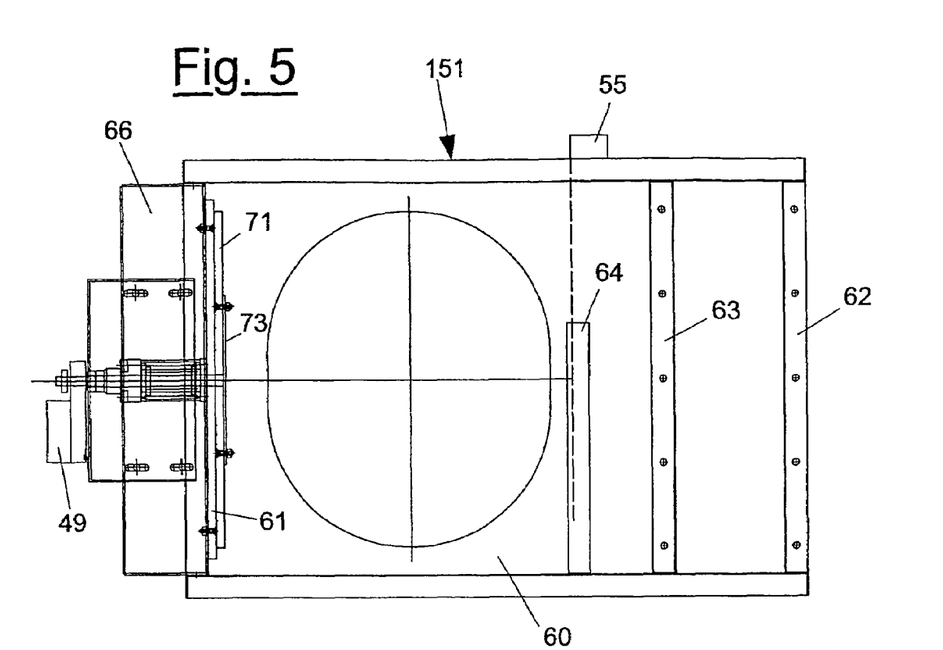
FIGS. 5, 6 and 7 are a raised side view, a plan view from above and an exploded perspective view respectively, of a second embodiment example of a probe housing unit which can form part of the system represented in FIG. 1.
Figure 6:
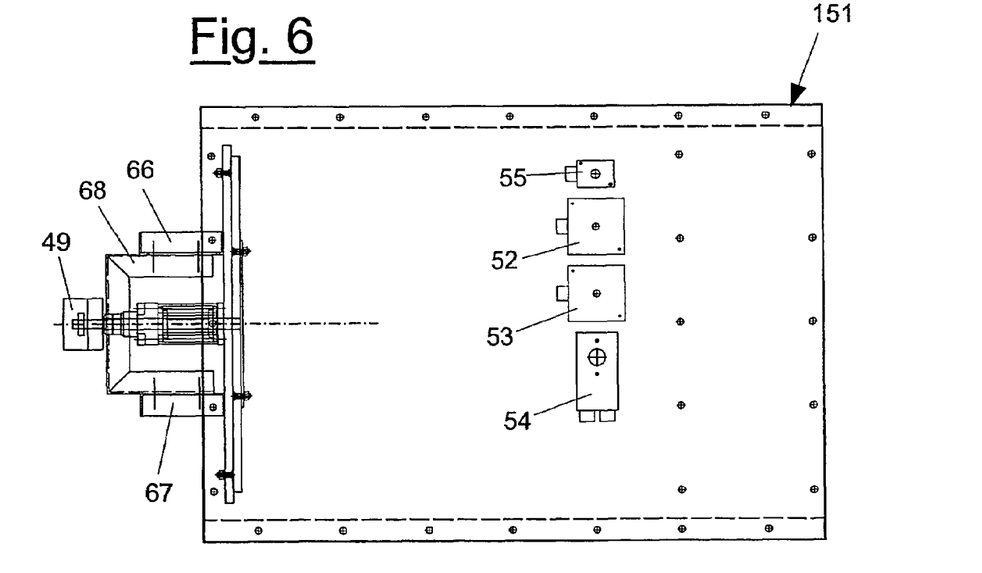
Figure 7:
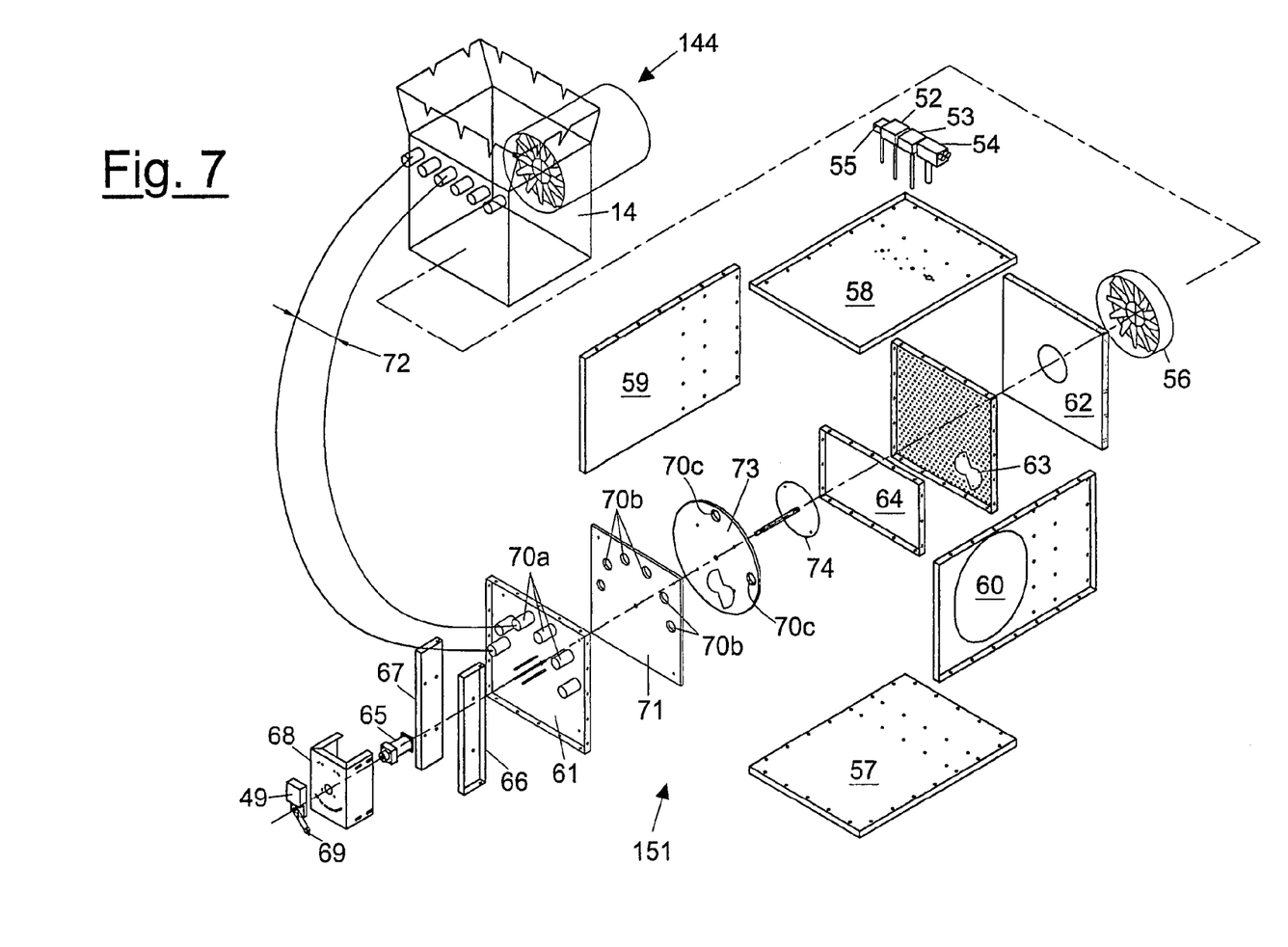

A further embodiment can envisage a different type of housing unit 144 for the humidity and temperature probes, situated downstream of the vaporization section in the duct 14.

This unit 144 consists of a chamber 151 made up of side panels 57, 58, 59 and 60 and end plates 61 and 62. In particular, a front plate 61 is equipped with holes 70a associated with holes 70b situated in a fixed plate 71 positioned inside the chamber 151. The holes 70a are connected by means of flexible tubes 72 to the duct 14 from which air samples are removed in different points of the duct section. A rotating disk 73, equipped with holes 70c which alternatively connects different flexible tubes 72 between the chamber 151 and the duct 14, is, in fact, situated inside the chamber 151.

There is also an equalizer panel 64 positioned in correspondence with the arrangement of outgoing tubes from the humidity and temperature probes 52, 53, 54 and 55. A shaft 74 is activated by the motor-reducer 49 which controls and varies its rotation regime. A tightener 65 situated between plates 66, 67 and 68 connects the shaft 74 and the servo-engine 49.

A perforated sheet 63 is also envisaged, which acts as an equalizing panel before the connection to the suction fan 56 and re-conveyance of the samples of comburent air in the duct 14 downstream of the above probes.

The flexible ducts or tubes 72 selectively remove, according to the rotation of the disk 73, the comburent air samples which are sent close to the probes and then re-introduced into the duct 14.

It can thus be seen that the water treatment and pressurization system for the adiabatic cooling of comburent air according to the invention, achieves the objectives specified above.

The invention claimed is:

1. A water treatment and pressurization system for the adiabatic cooling of comburent air destined for plants using gas turbines (15), run by measuring, control and regulation units, said water treatment and pressurization system comprising a pressurizing station (16) for vaporization water at a varying flow-rate for a maximum operating pressure up to 120 bar, said pressurizing station (16) being associated with a series of nozzles (20) situated on nozzle-holder ramps (12) downstream of which there is at least one housing unit (144) for humidity and temperature probes (52-55), wherein said pressurizing station (16) has, as pumping unit, one or more pumps (22), each equipped with a continuous electric-electronic inverter (38, 38a) for the regulation of the rotation rate, said pumps (22) being automatically operated by an automatic measurement and control system (41, 42).

2. The water treatment and pressurization system according to claim 1, characterized in that said system is installed and/or integrated in both newly constructed and installed and also in already existing auxiliary plants for gas turbines.

3. The treatment and pressurization system according to claim 1, characterized in that said housing unit (44) comprises a chamber (51) which houses measuring and control units, wherein said chamber (51) is positioned horizontally or vertically on or in duct (14) of comburent air, said chamber (51) being associated with external concentric container element (45) and internal concentric container element (48), both equipped with a number of holes (47, 50), arranged in an out-of-axis sequence with suitable dimensions for the passage of comburent air, wherein the external concentric container element (45) is fixed and the internal concentric container element (48) rotates on its own axis.

4. The treatment and pressurization system according to claim 3, characterized in that the moveable container element (48) is equipped with an engine (49), coupled with a rotation reducer, whose function is to allow a sequential flow of comburent air to the measuring units.

5. The treatment and pressurization system according to claim 3 or 4, characterized in that the fixed container element (45) is associated with one or more measuring units (52-55), having at the end of said fixed container element (45), a fan (56), that is positioned downstream of said measuring units, for the suction of the sample of comburent air.

6. The water treatment and pressurization system according to claim 1, characterized in that said pressurizing station (16) is equipped with at least one pair of parallel pumps (22) each provided with a series of components which, on the suction side of the pump (22), consist of a manual interception valve (26) for the exclusion of water, an electromagnetic valve (27) of the on/off type, upstream of a filter (28) and a minimum pressure manostat (29), and a manometer (30) for the analogical reading of the feeding pressure, and on the pressure side of the pump (22) there is a manometer (32) for controlling the pressurization state, together with a pre-calibrated safety valve (33) for the protection of the maximum allowable operating pressure, a hydraulic accumulator (34) for compensating for pressure differences, a three-way by-pass valve (35), calibrated at the maximum operating value, a three-way valve (36), inserted downstream and in sequence with the three-way bypass valve (35), a maximum/minimum pressure manostat (37), and having a flexible connector(31) that connects a water conveyor duct (25) and each pump (22) to ramp-holder collectors (39).

7. The water treatment and pressurization system according to claim 1, characterized in that the quantity of water sent to the nozzles and vaporized thereby can be continuously varied, according to the necessities of the measuring, regulation and control units in the present cooling system.

8. The treatment and pressurization system according to claim 1, characterized in that said housing unit (144) comprises a chamber (151) which houses measuring and control units (52-55), wherein said chamber (151) consists of side panels (57, 58, 59 and 60) and end plates (61 and 62), a front plate (61) equipped with holes (70a) associated with holes (70b) situated in a fixed plate (71) positioned inside the chamber (151), in which said holes (70a) are connected by means of flexible tubes (72) to a duct (14) from which air samples are removed in different points of the duct section, and having a rotating disk (73), equipped with at least one hole (70c) which alternatively connects at least one of said flexible tubes (72) to the chamber (151) and the duct (14).

9. The treatment and pressurization system according to claim 8, characterized in that it also comprises an equalizer panel (64) positioned in correspondence with the arrangement of outgoing tubes from the humidity and temperature probes (52, 53, 54 and 55).

10. The treatment and pressurization system according to claim 9, characterized in that it has downstream of said equalizer panel (64), a perforated sheet (63) which acts as an equalizer panel before the connection to a suction fan (56) and re-conveying of the comburent air samples in a duct (14) downstream of said humidity and temperature probes (52-55).

* * * * *